US008204946B2

(12) United States Patent
Luo

(10) Patent No.: US 8,204,946 B2
(45) Date of Patent: Jun. 19, 2012

(54) METHOD AND APPARATUS FOR PROCESSING INSTANT MESSAGING INFORMATION

(75) Inventor: Xinxin Luo, Shenzhen (CN)

(73) Assignee: Tencent Technology (Shenzhen) Company Ltd., Shenzhen (CN)

( * ) Notice: Subject to any disclaimer, the term of this patent is extended or adjusted under 35 U.S.C. 154(b) by 124 days.

(21) Appl. No.: 12/620,542

(22) Filed: Nov. 17, 2009

(65) Prior Publication Data

US 2010/0064018 A1    Mar. 11, 2010

Related U.S. Application Data

(63) Continuation of application No. PCT/CN2008/071743, filed on Jul. 24, 2008.

(30) Foreign Application Priority Data

Aug. 13, 2007    (CN) .......................... 2007 1 0120232

(51) Int. Cl.
    *G06F 15/16* (2006.01)
(52) U.S. Cl. ........ 709/206; 709/208; 709/224; 709/229; 705/7; 705/51; 707/2; 707/736
(58) Field of Classification Search .................. 709/206; 705/7, 51; 707/2, 736
    See application file for complete search history.

(56) References Cited

U.S. PATENT DOCUMENTS

| 7,412,527 | B2* | 8/2008 | Pulver et al. ................ 709/229 |
| 7,499,965 | B1* | 3/2009 | Chai ............................ 709/202 |
| 7,552,181 | B2* | 6/2009 | Wang et al. .................. 709/206 |
| 7,680,858 | B2* | 3/2010 | Poola et al. .................. 707/736 |
| 7,730,169 | B1* | 6/2010 | Greschler et al. ............ 709/223 |
| 7,734,722 | B2* | 6/2010 | Seidl et al. .................. 709/218 |
| 2002/0091677 | A1* | 7/2002 | Sridhar ............................ 707/2 |
| 2004/0210532 | A1* | 10/2004 | Nagawa et al. ................ 705/51 |
| 2005/0093709 | A1* | 5/2005 | Franco et al. ............. 340/686.1 |
| 2006/0026237 | A1* | 2/2006 | Wang et al. .................. 709/206 |
| 2006/0075054 | A1* | 4/2006 | Zhang et al. ................. 709/206 |
| 2006/0143307 | A1* | 6/2006 | Codignotto .................. 709/246 |
| 2006/0160548 | A1* | 7/2006 | Chen et al. .................. 455/466 |

(Continued)

FOREIGN PATENT DOCUMENTS

CN    1536483 A    10/2004

(Continued)

OTHER PUBLICATIONS

Chinese Office Action for Application No. 2007101202320, dated Jul. 17, 2009.

*Primary Examiner* — Wing Chan
*Assistant Examiner* — Razu Miah
(74) *Attorney, Agent, or Firm* — Marshall, Gerstein & Borun LLP

(57) ABSTRACT

An embodiment of the present invention provides a method for processing IM information. The method includes: obtaining hyperlink information contained in IM information; obtaining original content information of a webpage corresponding to the hyperlink information; generating content abstract information of the webpage according to the original content information of the webpage; and displaying the content abstract information of the webpage. An embodiment of the present invention further provides an apparatus for processing IM information. According to embodiments of the present invention, when a user receives the IM information containing the hyperlink information, the user can obtain webpage contents corresponding to the hyperlink information contained in the IM information.

11 Claims, 4 Drawing Sheets

U.S. PATENT DOCUMENTS

| | | | |
|---|---|---|---|
| 2006/0190543 A1* | 8/2006 | Pulver et al. | 709/206 |
| 2007/0016490 A1* | 1/2007 | Nowak | 705/26 |
| 2007/0124414 A1* | 5/2007 | Bedingfield et al. | 709/217 |
| 2007/0233513 A1* | 10/2007 | Lapstun et al. | 705/1 |
| 2007/0245035 A1* | 10/2007 | Attaran Rezaei et al. | 709/238 |
| 2008/0010292 A1* | 1/2008 | Poola | 707/10 |
| 2008/0140504 A1* | 6/2008 | Hyder et al. | 705/10 |
| 2008/0215678 A1* | 9/2008 | Coletrane et al. | 709/204 |
| 2008/0320124 A1* | 12/2008 | Lee et al. | 709/224 |
| 2009/0063209 A1* | 3/2009 | Dubois et al. | 705/7 |
| 2009/0265243 A1* | 10/2009 | Karassner et al. | 705/14.54 |
| 2010/0121711 A1* | 5/2010 | Park | 705/14.52 |

FOREIGN PATENT DOCUMENTS

| | | |
|---|---|---|
| CN | 1983252 A | 6/2007 |
| CN | 101102255 A | 1/2008 |

\* cited by examiner

METHOD AND APPARATUS FOR PROCESSING INSTANT MESSAGING INFORMATION

CROSS-REFERENCE TO RELATED APPLICATION

This is a continuation of International Application No. PCT/CN2008/071743, filed Jul. 24, 2008, which claims the priority benefit of Chinese Patent Application No. 200710120232.0, filed Aug. 13, 2007, the entire respective disclosures of which are incorporated herein by reference.

FIELD OF THE INVENTION

The present invention relates to Instant messaging (IM) technologies, and more particularly, to a method and apparatus for processing IM information.

BACKGROUND OF THE INVENTION

Along with fast developments of Internet technologies, a network Instant Messenger, i.e. an IM tool, has been accepted by most netizens. The IM tool is widely used not only in leisure and entertainment but also in work environments. Currently, the IM tool has become a necessary part of work and life. Along with developments of the IM tool, more and more communications and entertainment services are provided through the IM tool, and functions are improved increasingly. At the first beginning, the IM tool just provides a basic text communication function. But now, the IM tool can also send varieties of expression information, picture information and files; in addition, a user can have an audio chat and a video chat with an IM friend, and also can share a song or play an online game with the IM friend.

Because contents on the Internet are numerous, rich and colorful, during interaction through the IM tool, users usually exchange information on the Internet with each other and recommend an excellent webpage to each other. To realize this, a conventional manner is that a user inputs hyperlink information of the webpage into a first IM chat window, such as a hyperlink address, and transmits the hyperlink information to an IM receiving end. The IM receiving end directly displays the hyperlink information in a second IM chat window. A user at the IM receiving end can directly click the hyperlink information displayed in the second IM chat window to start a browser to access the webpage corresponding to the hyperlink information.

However, the above conventional manner has the following disadvantages.

The IM tool transmits the hyperlink information in a relatively simple manner, that is, just transmits the hyperlink information as special text information. Similarly, the IM receiving end also displays the received hyperlink information in a text information manner. To see contents of the webpage corresponding to the hyperlink information, the user at the IM receiving end needs to start the browser to access the webpage, which requires the user at the IM receiving end to switch between the IM tool and the browser repeatedly.

As can be seen, the conventional processing for the IM information needs complicated operations and occupies a large number of terminal system resources due to starting the browser. Further, after the user opens the webpage corresponding to the received hyperlink information, if the user is not interested in the contents of the webpage, time for interaction between the users is wasted and the instant messaging between an IM sending end and the IM receiving end is interrupted.

Therefore, the conventional solution for processing the IM information not only needs the complicated operations but also wastes the terminal system resources, and further interrupts an instant messaging conversation between the users of the IM tool.

SUMMARY OF THE INVENTION

In view of the above, an embodiment of the present invention provides a method for processing IM information. When the IM information contains hyperlink information, contents of a webpage corresponding to the hyperlink information are displayed in the IM information.

Another embodiment of the present invention provides an apparatus for processing IM information. When the IM information contains hyperlink information, contents of a webpage corresponding to the hyperlink information are displayed in the IM information.

A method for processing IM information includes:
obtaining hyperlink information contained in IM information;
obtaining original content information of a webpage corresponding to the hyperlink information;
generating content abstract information of the webpage according to the original content information of the webpage; and
displaying the content abstract information of the webpage.

An apparatus for processing IM information includes:
a hyperlink obtaining module, adapted to obtain hyperlink information contained in IM information;
a webpage obtaining module, adapted to obtain original content information of a webpage corresponding to the hyperlink information;
a content retrieving module, adapted to generate content abstract information of the webpage according to the original content information of the webpage; and
a display module, adapted to display the content abstract information of the webpage.

As can be seen from the above technical solutions, in embodiments of the present invention, when the IM information contains the hyperlink information, the content abstract information of the webpage corresponding to the hyperlink information can be displayed in the IM information. Hence, a user can know about contents of the webpage corresponding to the hyperlink information without starting a browser, which reduces an occupation rate of terminal system resources, saves the terminal system resources and improves processing efficiency of a terminal system.

As can be seen, in the embodiments of the present invention, the browser is not directly combined with functions of the IM tool, instead, a technical solution applicable to the IM tool for instantly previewing the contents of the webpage is provided.

Further more, the process of obtaining the content abstract information of the webpage need not involvement of the user, which greatly saves time for the user to know about the contents of the webpage, facilitates an IM operation of the user and improves interaction between users.

In addition, in the embodiments of the present invention, what is displayed to the user is the content abstract information obtained according to the original content information of the webpage but not the whole webpage, and the content abstract information is displayed at a position corresponding to the hyperlink information in a picture mode or in a dynamic window mode, such as, displayed right under the hyperlink information. Therefore, during the IM conversion, the user can know about the contents of the webpage more instantly and quickly.

Further, in the embodiments of the present invention, security of the hyperlink information is determined before the IM information containing the hyperlink information is processed, and insecure hyperlink information is discarded instead of processed. Therefore, it is possible to prevent a user system from being threatened by vicious hyperlink information.

DETAILED DESCRIPTION OF THE INVENTION

The present invention will be described in detail with reference to embodiments and accompanying drawings.

According to an embodiment of the present invention, a method for processing IM information includes:

obtaining hyperlink information contained in IM information; obtaining original content information of a webpage corresponding to the hyperlink information;

generating content abstract information of the webpage according to the original content information of the webpage; and displaying the content abstract information of the webpage.

In this embodiment, the process of generating the content abstract information of the webpage may be implemented at an IM sending end or an IM receiving end. If the IM sending end sends the IM information to the IM receiving end through an IM server, the process of generating the content abstract information of the webpage may be implemented at the IM server.

Embodiments of the present invention will be described hereinafter by supposing that the IM receiving end generates the content abstract information of the webpage.

Figure 1:
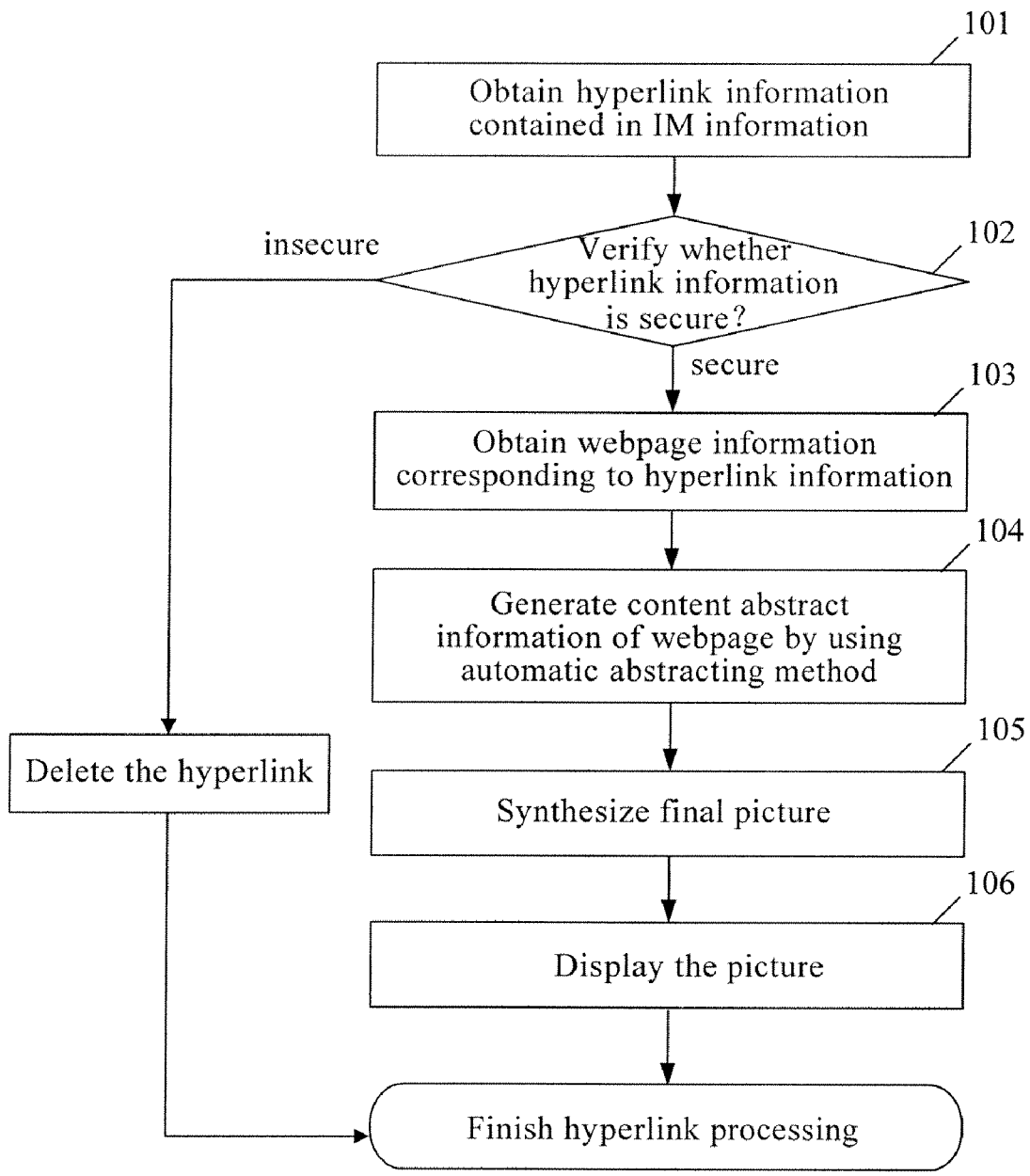
FIG. 1 is a flowchart illustrating a method for processing IM information according to an embodiment of the present invention.

FIG. 1 is a flowchart illustrating a method for processing IM information according to an embodiment of the present invention. As shown in FIG. 1, the method includes the following steps.

Step 101: Hyperlink information contained in IM information is obtained.

If the hyperlink information contained in the IM information is represented by a Uniform Resource Locator (URL), the URL in the IM information is retrieved in this step.

In an embodiment of the present invention, the IM receiving end may first determine whether the IM information contains the hyperlink information, e.g. whether the IM information contains the URL. If the IM information does not contain the hyperlink information, the IM information is processed according to a conventional method, i.e. is displayed directly at the IM receiving end. If the IM information contains the hyperlink information, Step 101 is performed to retrieve the hyperlink information from the IM information.

In an embodiment of the present invention, whether the IM information contains the hyperlink information may be determined according to a description form and characteristics of the hyperlink information. For example, if the hyperlink information is described in a string form and the string uses a particular English letter as a start tag, e.g. uses http:// as the start tag, and uses a particular character as an end tag, whether the IM information contains the hyperlink information may be determined according to the particular start tag or end tag of the string describing the hyperlink information.

In an embodiment of the present invention, the hyperlink information contained in the IM information may be obtained according to a position of the hyperlink information in the IM information. For example, the hyperlink information, such as the string describing the hyperlink information, may be obtained according to start and end positions of the hyperlink information in the IM information.

When the IM information contains more than one piece of hyperlink information, each piece of the hyperlink information is obtained from the IM information in this step.

Step 102: Whether the hyperlink information obtained is secure is verified.

If the hyperlink information obtained is secure, Step 103 is performed. If the hyperlink information obtained is insecure, the hyperlink information is deleted, and the procedure for processing the hyperlink information is terminated; or the procedure for processing the hyperlink information is directly terminated without deleting the hyperlink information.

When the IM information contains more than one piece of the hyperlink information, whether each piece of hyperlink information is secure is verified in this step.

In this embodiment of the present invention, Step 102 is optional. Through the security analysis on the hyperlink information obtained, the security of instant messaging between users can be guaranteed, and hyperlink information sent viciously by some invalid users to interrupt the normal use of the IM tool can be prevented.

Preferably, whether the hyperlink information is secure may be verified by a conventional security analysis solution, for example, determining whether the hyperlink information corresponds to a website in a blacklist, or whether the string describing the hyperlink information contains an invalid character.

Step 103: Original content information of a webpage corresponding to the hyperlink information is obtained.

In this embodiment, according to the hyperlink information such as the URL, the IM tool actively searches for the webpage corresponding to the hyperlink information at the background, obtains the original content information of the webpage, and caches the original content information of the webpage locally.

When the IM information contains more than one piece of hyperlink information, all pieces of hyperlink information are processed in this step, and original content information of webpages respectively corresponding to all pieces of the hyperlink information is obtained.

Step 104: Content abstract information of the webpage is generated according to the original content information of the webpage.

In an embodiment of the present invention, the content abstract information of the webpage may be generated through the following procedure.

Firstly, noise information, such as a guiding link, an advertisement link, marked copyright and date, is removed from the webpage so as to obtain a document text corresponding to the webpage.

Secondly, frequency of words appearing in the document text is calculated. By taking the frequency as word weight, a sentence with higher keyword weight is selected from each paragraph of the document text and is regarded as a key sentence. Because the key sentence can reflect subject contents of each paragraph of the webpage, the key sentence can be taken as text abstract information of the webpage.

Next, it is determined whether there is a picture surrounded by the key sentence in the webpage. For example, a conventional webpage determining technique may be adopted to determine whether a picture is a predetermined distance away from the key sentence; if yes, the picture is taken as picture abstract information of the webpage.

Finally, the text abstract information and the picture abstract information are taken as the content abstract information of the webpage.

According to an embodiment of the present invention, the content abstract information of the webpage may only include the text abstract information, i.e. key sentences of all the paragraphs in the webpage.

As to original content information of each webpage in Step 103, the above procedure may be used to analyze and process the original content information of each webpage so as to obtain the content abstract information of each webpage.

Step 105: A picture containing the content abstract information of the webpage is generated.

The content abstract information generated in Step 104 includes varieties of information such as pictures and words. In order to facilitate displaying the content abstract information to a user, the content abstract information of the webpage is synthesized to one picture in this embodiment. Thereby, the content abstract information of the webpage can be easily differentiated from other IM contents, which facilitates looking through the content abstract information by the user.

When the IM information contains more than one piece of hyperlink information, as to webpages respectively corresponding to all pieces of the hyperlink information, pictures respectively containing content abstract information of the webpages are generated.

In an embodiment of the present invention, the content abstract information of the webpage may also be displayed to the user in other modes. For example, the content abstract information of the webpage may be displayed in a dynamic display window. Content abstract information of each webpage corresponds to one dynamic display window. In this step, an instruction is generated to indicate that the content abstract information is displayed as the dynamic display window. When receiving the content abstract information and the instruction, the IM receiving end displays the content abstract information in the dynamic display window. Through the dynamic display window, the user can conveniently look through the content abstract information of the webpage.

In this embodiment of the present invention, Step 105 may also be optional. In another embodiment of the present invention, the content abstract information of the webpage may not be processed but be directly displayed in an IM chat window instead.

Step 106: The picture containing the content abstract information of the webpage is displayed.

After the above processing for the hyperlink information contained in the IM information, the IM receiving end displays the picture containing the content abstract information of the webpage. The webpage corresponds to the hyperlink information.

In an embodiment of the present invention, the content abstract information of the webpage may be displayed at a position corresponding to the hyperlink information, e.g. be displayed right under or beside the hyperlink information. Or alternatively, the content abstract information of the webpage may be directly displayed in a specific area of the IM chat window, e.g. always be displayed in the right-half part of the IM chat window.

In an embodiment of the present invention, it is also possible to display a dynamic display window generated according to the content abstract information or display the content abstract information directly.

In the above embodiment, it is the IM receiving end that obtains the content abstract information of the webpage. When this embodiment is applied, it may be the IM sending end that obtains the content abstract information of the webpage alternatively, i.e. the IM sending end performs the above Steps 101-105. After Step 105, the IM sending end sends the obtained content abstract information of the webpage to the IM receiving end, and the IM receiving end displays the content abstract information of the webpage. In other words, Step 106 is performed by the IM receiving end. The content abstract information of the webpage may be a picture containing the content abstract information of the webpage or a dynamic display window.

In addition, when the IM receiving end displays the content abstract information of the webpage in its IM chat window, the IM sending end also displays the content abstract information of the webpage in its IM chat window correspondingly.

The IM sending end also needs to send the IM information to the IM receiving end and, in this embodiment of the present invention, the IM sending end can send the IM information and the content abstract information of the webpage in the following two manners.

In a first manner, after performing Steps 101-105, the IM sending end sends the content abstract information of the webpage which is carried in the IM information to the IM receiving end. After receiving the IM information sent by the IM sending end, the IM receiving end displays contents of the IM information as well as the content abstract information of the webpage carried in the IM information in the IM chat window of the IM receiving end.

In a second manner, after performing Step 102, the IM sending end sends the contents of the IM information containing the secure hyperlink information to the IM receiving end. The insecure hyperlink information in the IM information is removed by the IM sending end and a position of the secure hyperlink information is marked. After receiving the IM information, the IM receiving end displays the contents of the IM information in its IM chat window. After obtaining the content abstract information of the webpage corresponding to the secure hyperlink information, the IM sending end sends the content abstract information to the IM receiving end. The IM receiving end displays the content abstract information at the marked position of the secure hyperlink information. If one piece of IM information contains more than one piece of hyperlink information, a position of each piece of the hyperlink information as well as content abstract information of a webpage corresponding to the hyperlink information should be marked. After receiving the content abstract information of the webpage corresponding to the hyperlink information, the IM receiving end displays the content abstract information right under or beside the marked position of corresponding hyperlink information.

When the embodiment of the present invention is applied, if the IM sending end sends the IM information to the IM receiving end via an IM server, it may be the IM server that processes the IM information, i.e. the IM server performs the above Steps 101-105. Thereafter, the IM server sends the content abstract information of the webpage to the IM receiving end. The content abstract information of the webpage is then displayed at the IM receiving end. The content abstract information of the webpage may be a picture containing the content abstract information of the webpage or a dynamic display window.

In an embodiment of the present invention, to facilitate looking through the content abstract information and corresponding hyperlink information by a user, the content abstract information and the corresponding hyperlink information may be displayed correspondingly, for example, the content abstract information may be displayed right under or beside the corresponding hyperlink information.

Figure 2:
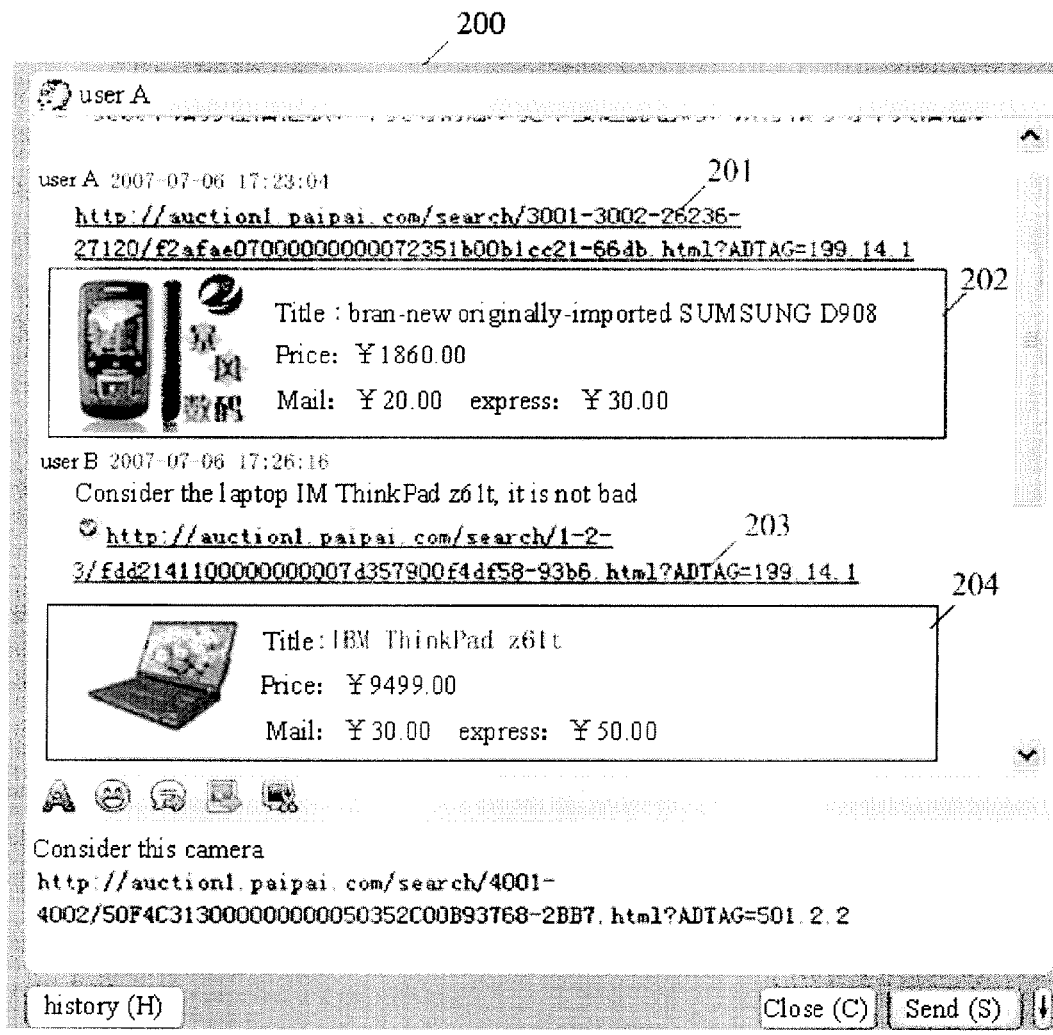
FIG. 2 is a schematic diagram illustrating an IM chat window displaying hyperlink information and content abstract information of a webpage corresponding to the hyperlink information according to an embodiment of the present invention.

FIG. 2 is a schematic diagram illustrating an IM chat window displaying hyperlink information and content abstract information of a webpage corresponding to the hyperlink information according to an embodiment of the present invention. The IM chat window shown in FIG. 2 can be located at an IM sending end or an IM receiving end.

As shown in FIG. 2, in an IM chat window 200, a picture containing content abstract information is displayed together with corresponding hyperlink information, i.e. the picture is displayed right under the corresponding hyperlink information. For example, as to hyperlink information 201 shown in FIG. 2, a picture 202 containing content abstract information of a webpage corresponding to the hyperlink information 201 is displayed right under the hyperlink information 201. The picture 202 contains text abstract information and picture abstract information in the webpage corresponding to the hyperlink information 201. A picture 204 containing content abstract information of a webpage corresponding to hyperlink information 203 is displayed right under the hyperlink information 203. The picture 204 contains text abstract information and picture abstract information in the webpage corresponding to the hyperlink information 203.

When users perform instant messaging, through the above Steps 101-106, the hyperlink information contained in the IM information may be processed as particular contents, and then the content abstract information of a webpage corresponding to the hyperlink information is generated. Thereby, the users in an IM conversation may instantly preview the content abstract information of the webpage corresponding to the hyperlink information, which saves time for the users to opening the hyperlink information to look through contents of the webpage and improves interaction between the users during a conversation process.

An embodiment of the present invention further provides an apparatus for processing IM information. The apparatus includes: a hyperlink obtaining module, adapted to obtain hyperlink information contained in IM information; a webpage obtaining module, adapted to obtain original content information of a webpage corresponding to the hyperlink information; a content retrieving module, adapted to generate content abstract information of the webpage according to the original content information of the webpage; a display module, adapted to display the content abstract information of the webpage.

Figure 3:
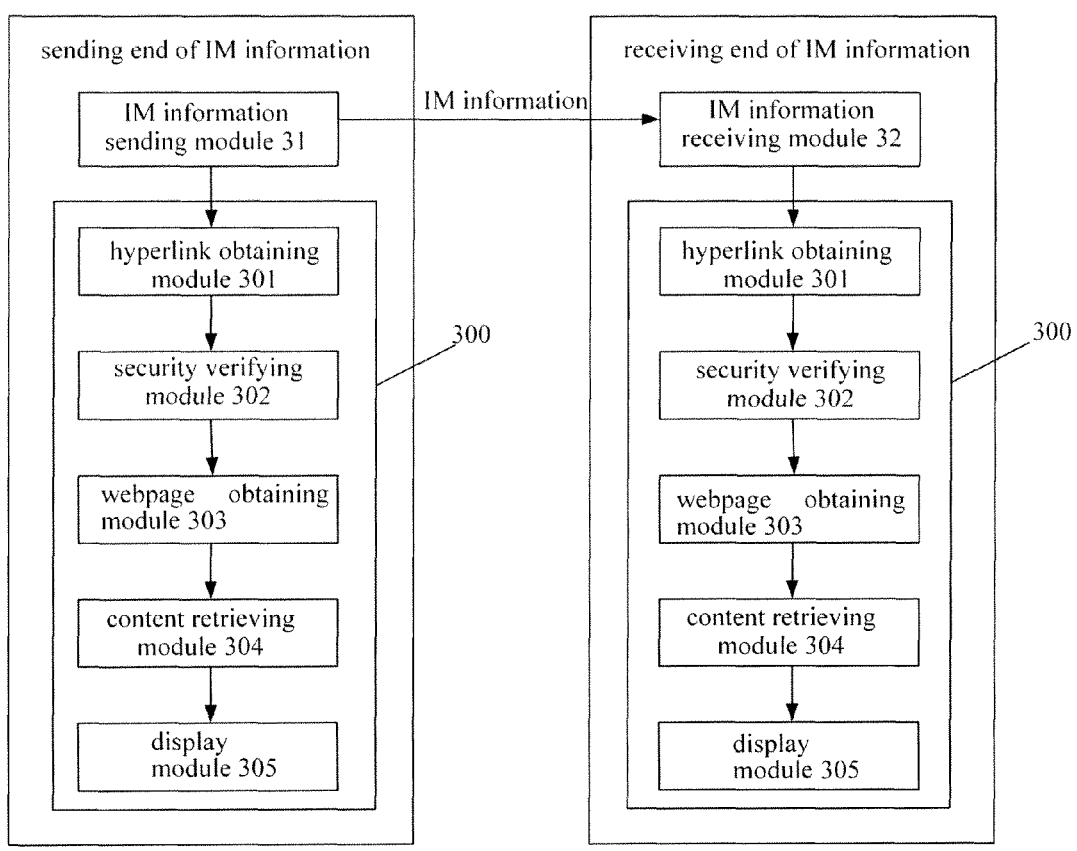
FIG. 3 is a schematic diagram illustrating a structure of an apparatus for processing IM information according to an embodiment of the present invention.

FIG. 3 is a schematic diagram illustrating a structure of an apparatus for processing IM information according to an embodiment of the present invention.

In this embodiment, the apparatus for processing the IM information is an apparatus 300. As shown in FIG. 3, the apparatus 300 may be configured at a sending end of the IM information or at a receiving end of the IM information. When the apparatus 300 is configured at the sending end of the IM information, while sending the IM information, an IM information sending module 31 triggers the apparatus 300 to process the IM information. When the apparatus 300 is configured at the receiving end of the IM information, after receiving the IM information, an IM information receiving module 32 triggers the apparatus 300 to process the IM information.

In this embodiment, the apparatus 300 mainly includes a hyperlink obtaining module 301, a security verifying module 302, a webpage obtaining module 303, a content retrieving module 304 and a display module 305.

The hyperlink obtaining module 301 is adapted to obtain hyperlink information from IM information.

The webpage obtaining module 303 is adapted to obtain original content information of a webpage corresponding to the hyperlink information obtained by the hyperlink obtaining module 301.

The content retrieving module 304 is adapted to obtain content abstract information of the webpage from the original content information of the webpage obtained by the webpage obtaining module 303.

The display module 305 is adapted to display the content abstract information of the webpage obtained by the content retrieving module 304.

The security verifying module 302, which is optional, is located between the hyperlink obtaining module 301 and the webpage obtaining module 303, and is adapted to determine whether the hyperlink information obtained by the hyperlink obtaining module 301 is secure. When the hyperlink information is secure, the security verifying module 302 sends the hyperlink information to the webpage obtaining module 303; when the hyperlink information is insecure, the security verifying module 302 does not send the hyperlink information to the webpage obtaining module 303. When the apparatus 300 does not include the security verifying module 302, the hyperlink information obtained by the hyperlink obtaining module 301 is directly sent to the webpage obtaining module 303.

In this embodiment, the content retrieving module 304 may be further adapted to generate a picture containing the content abstract information of the webpage. Accordingly, the display module 305 may further include a picture synthetic display module. When receiving a picture containing the content abstract information from the content retrieving module 304, the picture synthetic display module displays the picture received.

In this embodiment, the content retrieving module 304 may be further adapted to generate an instruction indicating that the content abstract information is displayed as a dynamic display window. Accordingly, the display module 305 may include a dynamic display window module. When receiving the instruction sent by the content retrieving module 304 and the content abstract information of the webpage, the dynamic display window module synthesizes the content abstract information of the webpage into the dynamic display window and displays the dynamic display window.

Figure 4:
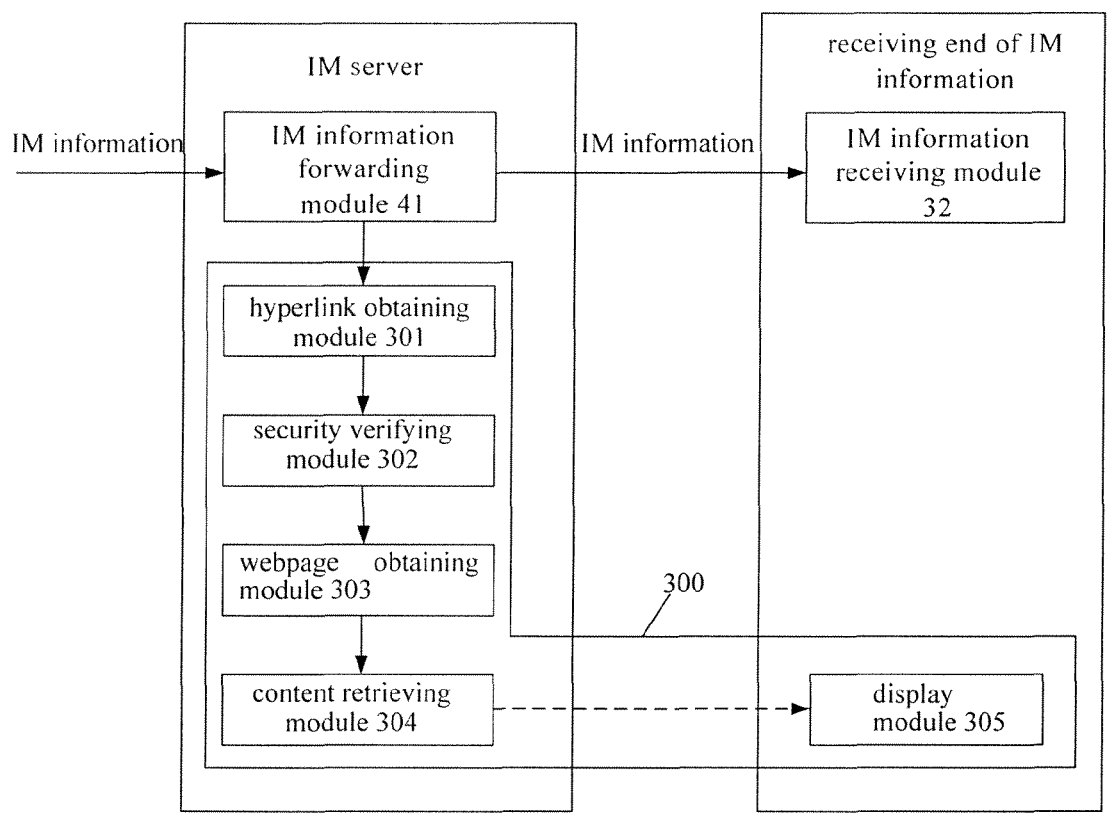
FIG. 4 is a schematic diagram illustrating another structure of the apparatus for processing the IM information according to an embodiment of the present invention.

FIG. 4 is a schematic diagram illustrating another structure of the apparatus for processing the IM information according to an embodiment of the present invention.

As shown in FIG. 4, in the apparatus 300, the hyperlink obtaining module 301, the security verifying module 302, the webpage obtaining module 303 and the content retrieving module 304 are configured at an IM server side. The display module 305 is configured at a receiving end of the IM information.

When forwarding IM information, an IM information forwarding module 41 in the IM server triggers the hyperlink obtaining module 301, the security verifying module 302, the webpage obtaining module 303 and the content retrieving module 304 to process the IM information. The IM server sends a processing result to the receiving end of the IM information. After receiving the processing result, the receiving end of the IM information triggers the display module 305 to display the processing result.

The processing result of the content retrieving module 304 may be sent to the receiving end of the IM information via the IM information forwarding module 41 in the IM server or via other communication modules in the IM server. Specifically, various sending manners may be used only if the processing result can be sent to the receiving end of the IM information. For clear description, FIG. 4 just uses a dashed arrow to illustrate that the processing result of the content retrieving module 304 is sent to the display module 305.

The foregoing is only embodiments of the present invention. The protection scope of the present invention, however, is not limited to the above description. Any change or substitution, easily occurring to those skilled in the art, should be covered by the protection scope of the present invention.

The invention claimed is:

1. A method for processing Instant Messaging (IM) information, comprising:
   obtaining hyperlink information contained in the IM information;
   obtaining original content information of a webpage corresponding to the hyperlink information;
   generating content abstract information of the webpage according to the original content information of the webpage; and
   displaying the content abstract information of the webpage;
   wherein generating the content abstract information of the webpage according to the original content information of the webpage comprises,
   removing noise information of the webpage to obtain a document text corresponding to the webpage,
   obtaining at least one key sentence from a paragraph of the document text according to frequency of words appearing in the document text, and
   taking the at least one sentence as the content abstract information of the webpage;
   wherein the content abstract information of the webpage is generated by an IM sending end and is displayed by an IM receiving end;
   sending, by the IM sending end, the IM information containing the hyperlink information to the IM receiving end and marking, by the IM sending end, a position of the hyperlink information contained in the IM information;
   displaying, by the IM receiving end, the IM information containing the hyperlink information;
   sending, by the IM sending end, the content abstract information of the webpage to the IM receiving end after generating the content abstract information of the webpage; and
   displaying, by the IM receiving end, the content abstract information of the webpage at the marked position of the hyperlink information.

2. The method of claim 1, further comprising:
   determining whether the hyperlink information is secure after obtaining the hyperlink information; and
   obtaining the original content information of the webpage corresponding to the hyperlink information if the hyperlink information is secure.

3. The method of claim 1, further comprising:
   determining whether the webpage contains a picture which is a predetermined distance away from the at least one key sentence; and
   taking the picture and the at least one key sentence as the content abstract information of the webpage if the webpage contains the picture which is the predetermined distance away from the at least one key sentence.

4. The method of claim 1, further comprising:
   generating a picture containing the content abstract information of the webpage after generating the content abstract information of the webpage;
   wherein displaying the content abstract information of the webpage comprises displaying the picture containing the content abstract information of the webpage.

5. The method of claim 1, further comprising:
   generating an instruction indicating that the content abstract information is displayed as a dynamic display window after generating the content abstract information of the webpage;
   wherein displaying the content abstract information of the webpage comprises displaying the content abstract information of the webpage in the dynamic display window.

6. The method of claim 1, further comprising:
   displaying the content abstract information of the webpage at the IM sending end.

7. A computer-implemented apparatus useful in processing Instant Messaging (IM) information, wherein the computer-implemented apparatus comprises one or more processors coupled to a memory storing instructions, for executing by the one or more processors, configured to:
   obtain hyperlink information contained in IM information;
   obtain original content information of a webpage corresponding to the hyperlink information;
   remove noise information of the webpage to obtain a document text corresponding to the webpage;
   obtain at least one key sentence from a paragraph of the document text according to frequency of words appearing in the document text, take the at least one sentence as the content abstract information of the webpage;
   display the content abstract information of the webpage;
   send the IM information containing the hyperlink information, and mark a position of the hyperlink information contained in the IM information;
   display the IM information containing the hyperlink information;
   send the content abstract information of the webpage after generating the content abstract information of the webpage; and
   display the content abstract information of the webpage at the marked position of the hyperlink information.

8. The computer-implemented apparatus of claim 7, wherein the instructions are further configured to determine whether the hyperlink information received is secure, and send the hyperlink information when the hyperlink information is secure.

9. The computer-implemented apparatus of claim 7, wherein the instructions are further configured to:
   determine whether the webpage contains a picture which is a predetermined distance away from the at least one key sentence, and take the picture and the at least one key sentence as the content abstract information of the webpage if the webpage contains the picture which is the predetermined distance away from the at least one key sentence.

10. The computer-implemented apparatus of claim 7, wherein the instructions are further configured to generate a picture containing the content abstract information of the webpage;
   and to display the picture containing the content abstract information of the webpage.

11. The computer-implemented apparatus of claim 7, wherein the instructions are further configured to indicate that the content abstract information is displayed as a dynamic display window;
   and to display the content abstract information of the webpage as the dynamic display window.

* * * * *